US010617972B2

(12) United States Patent
Velasco Valcke

(10) Patent No.: US 10,617,972 B2
(45) Date of Patent: Apr. 14, 2020

(54) DEVICE FOR EXTRACTING WATER FROM THE ENVIRONMENT

(71) Applicant: PANACEA QUANTUM LEAP TECHNOLOGY LLC, Dallas, TX (US)

(72) Inventor: Francisco Javier Velasco Valcke, Bogotá (CO)

(73) Assignee: Panacea Quantum Leap Technology LLC, Dallas, TX (US)

( * ) Notice: Subject to any disclaimer, the term of this patent is extended or adjusted under 35 U.S.C. 154(b) by 418 days.

(21) Appl. No.: 15/536,126

(22) PCT Filed: Dec. 15, 2015

(86) PCT No.: PCT/IB2015/059641
§ 371 (c)(1),
(2) Date: Oct. 28, 2017

(87) PCT Pub. No.: WO2016/098001
PCT Pub. Date: Jun. 23, 2016

(65) Prior Publication Data
US 2018/0126297 A1 May 10, 2018

(30) Foreign Application Priority Data

Dec. 15, 2014 (CO) .................................. 14-275300

(51) Int. Cl.
*B01D 1/28* (2006.01)
*B01D 53/047* (2006.01)
(Continued)

(52) U.S. Cl.
CPC ........... *B01D 1/2881* (2013.01); *B01D 53/02* (2013.01); *B01D 53/0476* (2013.01);
(Continued)

(58) Field of Classification Search
CPC .............. B01D 1/2881; B01D 2252/10; B01D 2252/2023; B01D 2257/80; B01D 53/02;
(Continued)

(56) References Cited

U.S. PATENT DOCUMENTS 2,894,376 A 7/1959 Kelley
3,064,952 A 11/1962 Brown
(Continued)

FOREIGN PATENT DOCUMENTS

CA 895847 A 3/1972
DE 19545335 A1 * 6/1997 ........... B01D 53/229
(Continued)

OTHER PUBLICATIONS

Machine translation of DE-19545335-A1 by ESPACEnet (Year: 2019).*

(Continued)

*Primary Examiner* — Cabrena Holecek
(74) *Attorney, Agent, or Firm* — The Morales Law Firm; Joseph L. Morales

(57) ABSTRACT

The present invention consists of a device for extracting water from the environment, comprising a means for capturing water from the environment by means of a liquid desiccant, an evaporation chamber, an evaporation mechanism, a duct through which liquid desiccant with water flows from the capture means to the evaporation chamber, a duct through which liquid desiccant flows from the evaporation chamber to the capture means, a reservoir for depositing water extracted from the liquid desiccant in the evaporation chamber, a duct through which water flows from the cylinder of the evaporation mechanism to the reservoir, and a control device that controls the compressor. The evaporation mechanism comprises a cylinder located inside the evaporation chamber, a membrane located inside the cylinder, and a
(Continued)

compressor operationally connected to the membrane to inflate and deflate the membrane.

23 Claims, 4 Drawing Sheets

(51) Int. Cl.
| | | |
|---|---|---|
| *B01D 53/26* | (2006.01) | |
| *F24F 3/14* | (2006.01) | |
| *F25B 39/02* | (2006.01) | |
| *B01D 53/14* | (2006.01) | |
| *B01D 53/02* | (2006.01) | |
| *F25B 39/00* | (2006.01) | |
| *B01D 53/18* | (2006.01) | |
| *B01D 61/38* | (2006.01) | |

(52) U.S. Cl.
CPC ......... *B01D 53/14* (2013.01); *B01D 53/1425* (2013.01); *B01D 53/18* (2013.01); *B01D 53/26* (2013.01); *B01D 53/263* (2013.01); *F24F 3/14* (2013.01); *F24F 3/1417* (2013.01); *F25B 39/00* (2013.01); *F25B 39/02* (2013.01); *B01D 61/38* (2013.01); *B01D 2252/10* (2013.01); *B01D 2252/2023* (2013.01); *B01D 2257/80* (2013.01)

(58) Field of Classification Search
CPC .......... B01D 53/0476; B01D 53/14; B01D 53/1425; B01D 53/18; B01D 53/26; B01D 53/263; B01D 61/38; F24F 3/14; F24F 3/1417; F25B 39/00; F25B 39/02

See application file for complete search history.

(56) References Cited

U.S. PATENT DOCUMENTS

| | | | |
|---|---|---|---|
| 3,634,998 | A | 1/1972 | Patterson |
| 4,900,448 | A | 2/1990 | Bonne et al. |
| 6,216,483 | B1 | 4/2001 | Potnis et al. |
| 6,302,944 | B1 | 10/2001 | Hoenig |
| 6,514,321 | B1 | 2/2003 | Lehto et al. |
| 2002/0189448 | A1 | 12/2002 | Spletzer et al. |
| 2010/0013112 | A1 | 1/2010 | Forkosh |
| 2010/0090356 | A1 | 4/2010 | Sines et al. |
| 2013/0318790 | A1 | 12/2013 | Becze et al. |
| 2014/0150651 | A1 | 6/2014 | Valcke |
| 2017/0184318 | A1 | 6/2017 | Valcke |
| 2018/0126297 | A1 | 5/2018 | Valcke |

FOREIGN PATENT DOCUMENTS

| | | |
|---|---|---|
| DE | 19545335 A1 | 6/1997 |
| EP | 0016470 B1 | 5/1983 |
| EP | 3135365 A2 | 3/2017 |
| EP | 3278859 A1 | 2/2018 |
| JP | 54456 A | 1/1979 |
| JP | 54457 A | 1/1979 |
| JP | 61149229 | 7/1986 |
| JP | 61164621 | 7/1986 |
| JP | 61259728 | 11/1986 |
| JP | 61259728 A2 | 11/1986 |
| JP | 11132505 A | 5/1995 |
| JP | 09210412 A | 8/1997 |
| JP | 11132593 A | 5/1999 |
| JP | 3946325 B2 | 7/2007 |
| JP | 6223149 B2 | 11/2017 |
| JP | 6223418 B2 | 11/2017 |
| JP | 6223419 B2 | 11/2017 |
| WO | 9100759 A1 | 1/1991 |
| WO | 2000027506 A1 | 5/2000 |
| WO | 2012082093 A1 | 6/2012 |
| WO | 2015113154 A1 | 8/2015 |

OTHER PUBLICATIONS

Abdel-Salam, A. H, et al. Capacity Matching in Heat-Pump Membrane Liquid Dessicant Air Conditioning Systems. International Journal of Refrigeration, 48 (2014) 166-177.

\* cited by examiner

DEVICE FOR EXTRACTING WATER FROM THE ENVIRONMENT

FIELD OF THE INVENTION

The present invention relates to dehumidifiers, and specifically, to systems that capture water from the air by means of liquid desiccants.

DESCRIPTION OF PRIOR ART

The goal of dehumidification processes is to capture humidity from the environment using materials that tend to establish an equilibrium between the humidity level of their environment and the humidity level of said materials. When it is also necessary to counteract high latent moisture loads, desiccants are used to decrease the moisture content of the air in thermal processes. Desiccants are chemical substances that have a high affinity for humidity, that is to say, that are capable of extracting water vapor from the air, in comparatively large amounts relative to their weight and volume. The physical process that allows for the retention or release of humidity is the difference in vapor pressure between the surface of the desiccant and ambient air. Their water retention properties are due to surface adsorption and capillary condensation. Desiccants can be classified as absorbents, which experience chemical changes when they retain or release moisture, or as adsorbents, which retain or release moisture without experiencing chemical changes; i.e., the only change is the addition of the mass of water vapor to the desiccant. Desiccants may be solid or liquid. Many liquid desiccants are absorbent.

The dehumidification of air by means of desiccants occurs when the vapor pressure at the surface of the desiccant is lower than the vapor pressure of ambient air. When the water vapor is adsorbed, the vapor pressure in the desiccant increases until it reaches equilibrium. This occurs when the vapor pressures in the desiccant and in the air are equal. In order to make the desiccant reusable, it must be regenerated, i.e., it is necessary to remove the moisture therefrom. This regeneration, or release of adsorbed water vapor from the desiccant, is accomplished by heating it in order to increase its vapor pressure, thereby expelling the moisture from the desiccant.

Prior art proposes systems for lowering environmental humidity based on the use of liquid desiccant materials, wherein the liquid desiccant captures vapor present in the atmosphere, and subsequently releases it when heated and/or subjected to a pressure differential. A disclosure that provides evidence for the above is presented in patent US2002/0189448 A1, which discloses a device for the manipulation of the water present in a fluid.

US2002/0189448 A1 discloses a device for the extraction of water from the environment using a desiccant. The device comprises two chambers for the extraction of water. A desiccant is placed in the first chamber such that it captures water vapor from an airflow that enters and exits the chamber through two ports. The second chamber comprises a positive displacement piston pump, and a port placed at the bottom of the second chamber, that is connected to a reservoir. The two chambers are connected by a duct comprising a port. Water vapor is captured by the desiccant. During the capture of water vapor, the ports of the first chamber remain open and the port in the duct that connects the chambers remains closed. After the capture of water vapor, the ports of the first chamber close, and the port that connects the chambers opens, the piston pump of the second chamber is displaced, thereby producing a suction effect in the first chamber; the port of the second chamber remains closed during this process. Due to the suction effect, the water vapor captured by the desiccant located in the first chamber flows into the second chamber. Once the piston pump completes its trajectory, the port that connects the chambers closes, and the piston pump travels in the opposite direction, thereby compressing the water vapor, and condensing it as a result. Once the piston pump completes the trajectory by which it condenses the water vapor, the port of the second chamber opens, allowing water in liquid phase to flow into the reservoir, and the process restarts in order to capture more water.

This prior art document describes a device for the capture of water from the environment that operates in batches, that is to say, the process is not continuous. Moreover, instruments are needed to operate the piston pump and manipulate the ports, and at least one operator is needed for manual operation of the device.

BRIEF DESCRIPTION OF THE INVENTION

The present invention refers to a device that captures water from environmental air by means of liquid desiccants.

The device comprises a capture means, an evaporation chamber, an evaporation mechanism operationally connected to the evaporation chamber, a duct through which liquid desiccant with water flows from the capture means to the evaporation chamber, a duct through which liquid desiccant flows from the evaporation chamber to the capture means, a reservoir for depositing water extracted from the liquid desiccant with water in the evaporation chamber, a duct through which water flows from the cylinder to the reservoir, and a control device that controls the compressor. The evaporation mechanism comprises a cylinder located inside the evaporation chamber, a membrane located inside the cylinder, and a compressor operationally connected to the membrane to inflate and deflate the membrane.

Prior to the operation of the device, the cylinder is filled with water vapor. The compressor delivers air into the membrane, inflating and deflating it, which creates a pressure and temperature gradient inside the cylinder and consequently, causes heat to flow toward the walls of the cylinder.

The liquid desiccant captures water from the environment in the capture means, yielding liquid desiccant with water. The liquid desiccant with water is regenerated in the extraction chamber. When the liquid desiccant with water enters the extraction chamber, it moistens the cylinder, and absorbs the heat transferred to the walls of the cylinder, and as a result, water evaporates from the liquid desiccant with water. The water vapor flows into the cylinder.

The water vapor condenses inside the cylinder when subjected to the pressure gradient created by the inflation and deflation of the membrane. The heat from the water vapor is transferred to the walls of the cylinder. The water then exits the cylinder and flows towards the reservoir.

The liquid desiccant flows from the evaporation chamber towards the capture means.

DETAILED DESCRIPTION OF THE INVENTION

The present invention discloses a device for extracting water from the environment by means of a liquid desiccant. The device of the present invention can extract water vapor from the air present in the environment.

Figure 1:
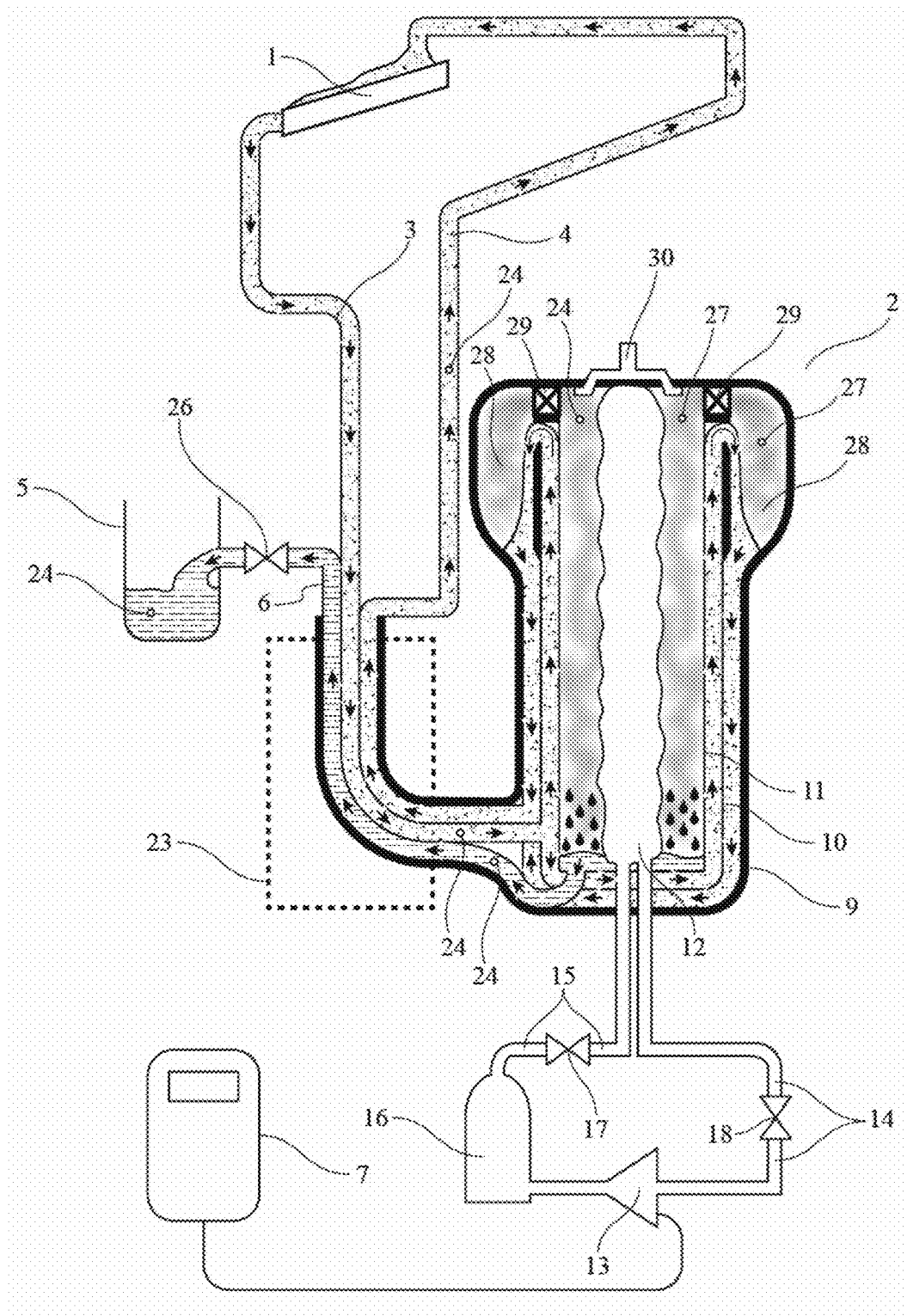
FIG. 1 shows a schematic view of an embodiment of the invention in which all of its components are depicted.

According to FIG. 1, the device of the present invention comprises:
- a capture means (1),
- an evaporation chamber (2),
- an evaporation mechanism,
- a duct (3) through which the liquid desiccant with water flows from the capture means (1) to the evaporation chamber (2),
- a duct (4) through which the liquid desiccant flows from the evaporation chamber (2) to the capture means (1),
- a reservoir (5),
- a duct (6) through which the water flows from the evaporation chamber (11) to the reservoir (5); and
- a control device (7).

The capture means (1) is the component of the device wherein the liquid desiccant captures water from the environment. According to FIG. 1, the capture means (1) is an inclined tray through which liquid desiccant flows in order to capture water.

In one embodiment of the invention, the capture means (1) is a reservoir in which the liquid desiccant is placed; inside the reservoir, the ambient air current flows and comes into contact with the desiccant for the purpose of capturing water. The capture means (1) allows the desiccant to come into contact with the environment in order to capture water, thereby producing desiccant with water.

In one embodiment of the invention, the capture means comprises a fan, a compressor or a turbine, which make the ambient air flow toward the tray through which the liquid desiccant flows or toward the reservoir in which the liquid desiccant is placed.

According to FIG. 1, the liquid desiccant with water flows through duct (3) from the capture means (1) to the evaporation chamber (2). According to FIG. 2, in another embodiment of the invention, a pump (8) is connected along duct (3) in order to control the flow of liquid desiccant with water to the evaporation chamber (2).

In another embodiment of the invention, pump (8) may be replaced by a valve, and the vacuum effect produced by the deflation of a membrane (12) in the expansion chamber (28) is used to suction the liquid desiccant with water that flows through duct (3); this case is explained hereinafter. If the pressure gradient does not sufficiently suction the liquid desiccant, pump (8) is incorporated.

Figure 2:
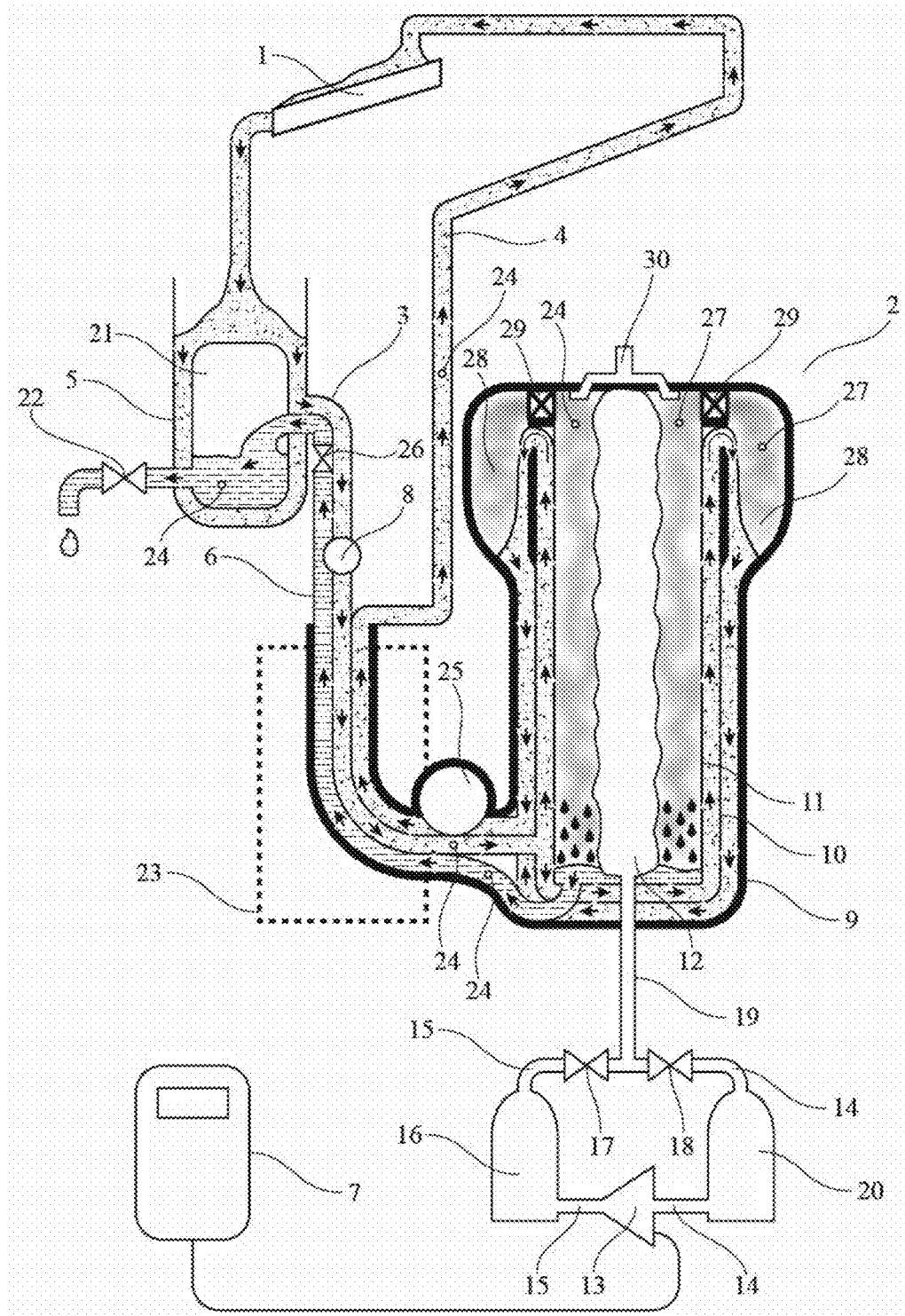
FIG. 2 shows a schematic view of an embodiment of the invention, in which the duct through which the water extracted in the evaporation chamber flows toward the reservoir, the duct through which the liquid desiccant flows from the evaporation chamber to the capture means, and the duct through which the liquid desiccant with water flows from the capture means to the evaporation chamber are configured as a heat exchanger, and the reservoir contains a closed tank.

According to FIG. 1 and FIG. 2, the evaporation chamber (2) is double-jacketed, i.e., the evaporation chamber has a first outer jacket (9) and a second internal jacket (10). The second jacket (10) has a lower height than the evaporation chamber (2). The second jacket (10) is made of an insulating material, or at least its top portion adjacent to the expansion chamber (28) is covered in a thermal insulation material.

According to FIG. 1, the evaporation mechanism comprises:
- a cylinder (11);
- a membrane (12), preferably made of an anticorrosive material;
- a compressor (13);
- a duct (14);
- a duct (15);
- a valve (17);
- a valve (18); and
- a tank (16).

Referring to FIG. 1, the cylinder (11), which is preferably made of a heat conducing, anticorrosive material, is placed inside the evaporation chamber (2). The membrane (12) is placed inside the cylinder (11). Duct (14) and duct (15) are connected to the membrane (12). Duct (14) is connected to the compressor (13) at the suction point of the compressor (13). Valve (18) is placed along duct (14). Duct (15) is connected to the compressor (13) at the discharge point of the compressor (13). Along duct (15), in the compressor (13)-to-membrane (12) direction, the tank (16) is placed first and then valve (17) is placed. When the compressor (13) suctions the fluid contained within the membrane (12), the fluid is stored in the tank (16) at a pressure higher than atmospheric pressure. During fluid suction by the compressor (13), valve (18) is kept open and valve (17) is kept closed. For membrane inflation (12), valve (18) is kept closed and valve (17) is kept open; since the pressure in the tank (16) is greater than the pressure in the membrane (12), the membrane (12) inflates. Initially, the tank (16) must be filled with fluid to inflate the membrane (12); during membrane (12) deflation, this fluid is suctioned by the compressor (13) and stored in the tank (16).

In one embodiment of the invention, along duct (14), in the membrane (12)-to-compressor (13) direction, valve (18) is placed first and then the tank (16) is placed, and valve (17) is placed along duct (15). Initially, the tank (16) must be filled with fluid. To inflate the membrane (12), the compressor suctions and increases the pressure of the fluid contained within the tank (16). During membrane (12) inflation, valve (17) is kept open and valve (18) is kept closed. Suction of the fluid contained within the tank (16) gives rise to a negative pressure in the tank (16); consequently, to deflate the membrane (12), valve (17) is kept closed and valve (18) is kept open, so the tank (16) suctions the fluid contained within the membrane (12).

FIG. 2 shows an embodiment of the invention, in which the membrane (12) is connected to a duct (19) that is connected to duct (14) and to duct (15). Along duct (14), in the duct (19)-to-compressor (13) direction, valve (18) is placed first and then a tank (20) is placed. Along duct (15), in the compressor (13)-to-duct (19) direction, the tank (16) is placed first and then valve (17) is placed. Tank (16) is filled with the fluid at higher than atmospheric pressure, and tank (20) is empty and at a negative gauge pressure. Consequently, to inflate the membrane (12), valve (17) is kept open and valve (18) is kept closed. To deflate the membrane (12), valve (17) is kept closed and valve (18) is kept open. The compressor (13) suctions the fluid contained within tank (20) and discharges it under pressure into tank (16); during this operation, valve (17) and valve (18) must be closed. In the embodiment of the invention, the work required of the compressor (13) is less than the work required in previous embodiments, since the pressure differential that the compressor (13) must create is lower when also using the pressure differentials created by the tanks. Furthermore, its operating times are shorter.

According to FIG. 1 and FIG. 2, the liquid desiccant with water enters through the bottom of the evaporation chamber (2), and flows between the wall of the cylinder (11) and the second jacket (10). Inflating and deflating the membrane (12) creates a pressure gradient and a temperature gradient within the evaporation chamber (2). The presence of a temperature gradient causes heat to be transferred through the wall of the cylinder (11). The heat transferred evaporates water present in the liquid desiccant with water. The evaporated water flows into evaporation chamber (2) in expansion chamber (28) and enters cylinder (11) through valve (29).

Valve (29) opens to allow evaporated water to enter the cylinder (11) when the membrane (12) is deflating; when the membrane (12) is inflating or is inflated, valve (29) remains closed. The liquid desiccant flows over the second jacket (10) and continues to flow between the second jacket (10) and the first jacket (9) until it reaches the bottom of the evaporation chamber, where it subsequently exits through duct (4). Valve (29) can be a one-way valve, or a solenoid valve controlled by the control device (7), as shown in FIG. 1 and FIG. 2.

According to FIG. 1, the liquid desiccant flows toward the capture means (1) through duct (4). According to FIG. 2, in one embodiment of the invention, a pump (25) is connected along duct (4) in order to pump the liquid desiccant with water toward the capture means (1).

According to FIG. 1 and FIG. 2, the water flows through duct (6) from the cylinder (11) toward the reservoir (5), where it is placed.

According to FIG. 1 and FIG. 2, a valve (26) is connected along duct (6), which when closed blocks the flow of water vapor inside the cylinder (11), and when the membrane (12) inflates, the pressure inside the cylinder increases, causing the water vapor to condense and yielding water in liquid state. When the water is in liquid state, valve (26) opens, allowing water to flow toward the reservoir (5). Valve (26) opens for an instant at the end of membrane (12) inflation, when the vapor has condensed, and closes before the vapor intake process begins, i.e., before membrane (12) begins to deflate, such that it allows water in liquid state, but not water vapor, to exit. In one embodiment of the invention, a pump is connected along duct (6), after valve (26), in order to pump water from cylinder (11) to reservoir (5).

Figure 3:
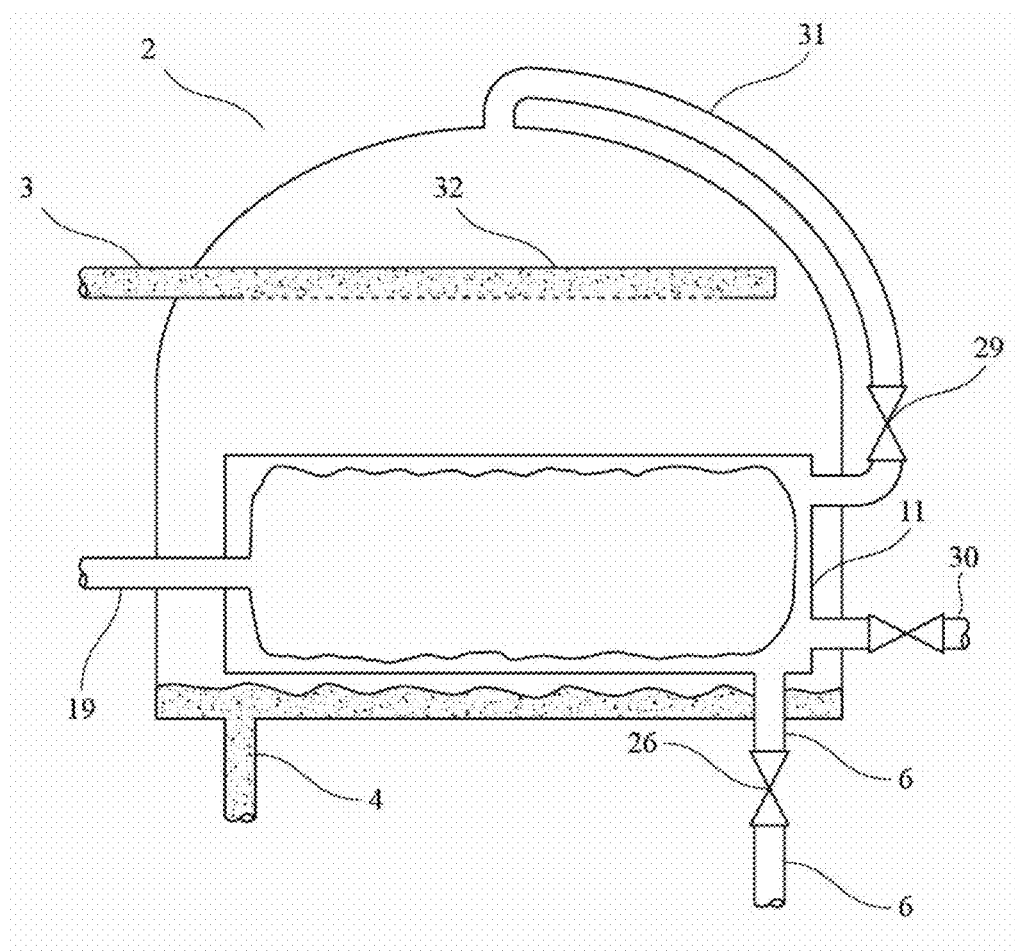
FIG. 3 shows the evaporation chamber in one embodiment of the invention, in which the liquid desiccant with water is placed inside the regeneration chamber when it is sprayed by a sprayer. The liquid desiccant comes into contact with the wall of a cylinder that transfers heat to the liquid desiccant with water in order to evaporate the water.

According to FIG. 3, in one embodiment of the invention, the liquid desiccant with water enters the evaporation chamber (2) through duct (3). Duct (3) is connected to sprayer (32) by which the liquid desiccant with water is sprayed inside the evaporation chamber (2). Evaporation chamber (11) contains cylinder (11), and cylinder (11) contains membrane (12), which is inflated or deflated by the fluid that flows through duct (19) connected to membrane (12).

Inflating and deflating membrane (12) creates a pressure and temperature gradient, and heat is transferred through the wall of cylinder (11). The liquid desiccant with water that exits sprayer (32) comes into contact with the walls of cylinder (11) and is heated by absorbing heat therefrom, and as a result, the water evaporates from the liquid desiccant with water. The liquid desiccant with water flows along the periphery of cylinder (11), exhibiting a Coanda effect.

Following water evaporation, the liquid desiccant falls to the bottom of evaporation chamber (2). The water vapor flows toward the top of evaporation chamber (2) and enters duct (31).

Duct (31) is connected to cylinder (11) to allow water vapor to flow into cylinder (11). A valve (29) is placed along duct (31), which is closed when membrane (12) inflates, blocking the flow of water into the cylinder (11), and is open when membrane (12) deflates, allowing water vapor to flow into cylinder (11).

When membrane (12) inflates, the pressure of the water vapor present inside cylinder (11) increases and it condenses at high temperatures; also, heat is transferred by the walls of cylinder (11) and the liquid water exits through duct (6) connected to cylinder (11). A valve (26) is placed along duct (6), which opens for an instant during the period of time corresponding to membrane (12) inflation, and also at the end of the membrane (12) inflation process, such that it allows water in liquid state, but not water vapor, to exit. Duct (4) through which liquid desiccant flows is connected at the bottom of evaporation chamber (2).

According to FIG. 1, FIG. 2 and FIG. 3, valve (30) is connected to cylinder (11). Valve (30) is optional in the device; it is used to deliver water vapor into cylinder (11), which is useful in initiating operation of the device when said device does not contain another means for initial vapor production, due to the fact that when membrane (12) is inflated, this water vapor heats up and transfers heat through the walls of cylinder (11), thereby decreasing the time needed to stabilize the operation of the device and starting to evaporate the water present in the liquid desiccant with water.

Figure 4:
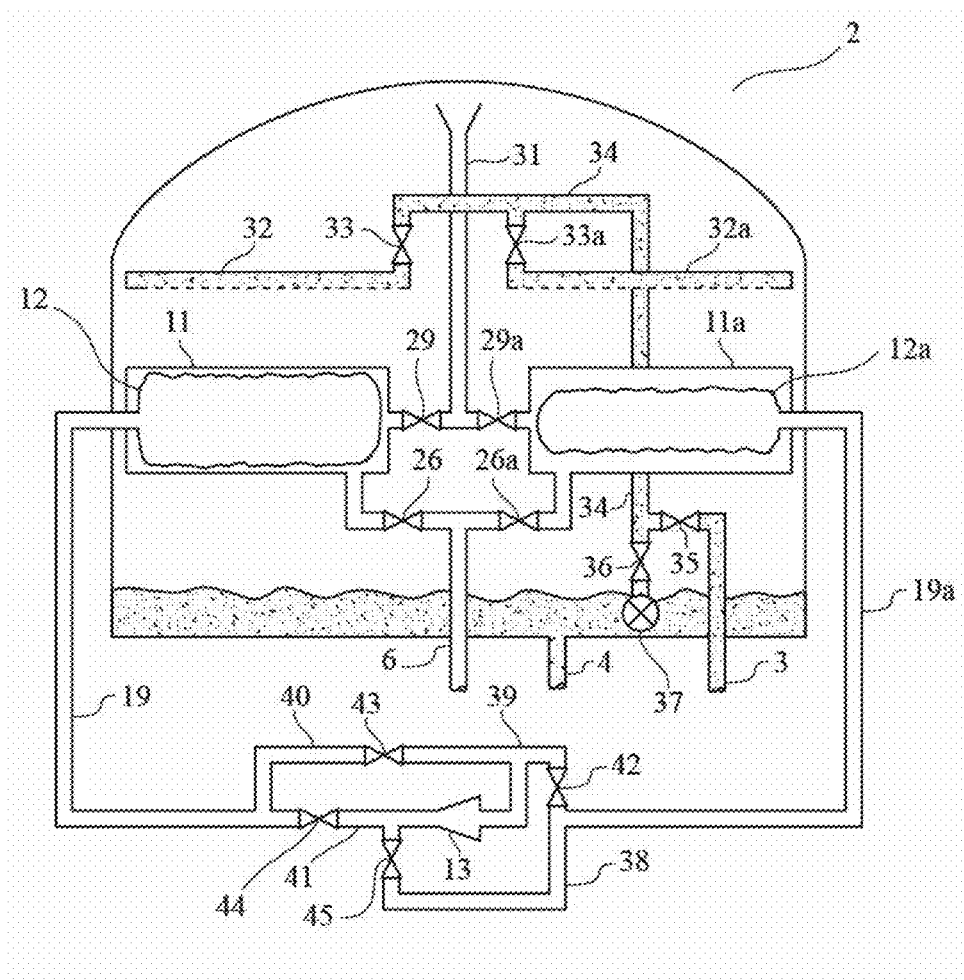
FIG. 4 shows the evaporation chamber in one embodiment of the invention, in which the liquid desiccant with water is placed inside the regeneration chamber when it is sprayed by a sprayer. The liquid desiccant comes into contact with the wall of a cylinder that transfers heat to the liquid desiccant with water in order to evaporate the water. The evaporation chamber contains two sprayers and one cylinder per sprayer.

According to FIG. 4, in one embodiment of the invention, two cylinders (11 and 11a), and two sprayers (32 and 32a) respectively, are placed in evaporation chamber (2).

Membrane (12) to which duct (19) is connected is placed inside cylinder (11); as for cylinder (11a), it contains membrane (12a) to which duct (19a) is connected. In this embodiment of the invention, duct (3) through which liquid desiccant with water flows is connected to duct (34); the latter is connected to sprayers (32) and (32a). Valve (35) is placed in duct (3), before the connection to duct (34). Pump (37) is placed at the bottom of evaporation chamber (2), which is connected to duct (34) by means of valve (36).

Before the connection of duct (34) to sprayer (32), a valve (33) is placed; sprayer (32a) and valve (33a) are arranged in the same manner. Duct (31) is connected to cylinders (11) and (11a); before the connection to cylinders (11) and (11a), valves (29) and (29a) are placed in duct (31) in order to connect to cylinders (11) and (11a), respectively. Water vapor flows through duct (31) toward cylinders (11) and (11a). Duct (6) is connected to cylinders (11) and (11a); before the connection to cylinders (11) and (11a), valves (29) and (29a) are placed in duct (31), respectively. Water flows through duct (6). Duct (4) through which liquid desiccant flows is connected at the bottom of the evaporation chamber (2). Ducts (19) and (19a) that connect to membranes (12) and (12a) are operationally connected to compressor (13) for the purpose of providing fluid for the inflation and deflation of membranes (12) and (12a). Duct (39) is connected to the suction point of compressor (13), which is connected to duct (19a) by means of valve (42).

Duct (41) is connected to the discharge point of compressor (13), which is connected to duct (19) by means of valve (44). After the connection of duct (41) to duct (19) by means of valve (44), duct (40) is connected to duct (19). Duct (40) is connected to duct (39) by means of valve (43). Before the connection of duct (41) to duct (19) by means of valve (44), duct (38) is connected to duct (41). Duct (38) is connected to duct (19a), and valve (45) is placed along the same. In one embodiment of the invention, ducts (19) and (19a) are connected to a compressor that alternates its connections between suction points or discharge points.

According to FIG. 4, the liquid desiccant with water enters evaporation chamber (2) through duct (3); if valve (35) is open, the liquid desiccant with water flows through duct (34) toward sprayers (32) and (32a). To spray the liquid desiccant with water inside cylinder (11) or cylinder (11a), the following applies:

If membrane (12) is inflating, liquid desiccant with water is sprayed by sprayer (32) onto cylinder (11), and valve (33) opens as a result;

If membrane (12a) is inflating, liquid desiccant with water is sprayed by sprayer (32a) onto cylinder (11a), and valve (33a) opens as a result;

According to FIG. 4, the liquid desiccant with water comes into contact with cylinders (11) and (11a), which evaporate the water from the liquid desiccant with water, due to the heat transferred by the walls of cylinders (11) and (11a) caused by the inflation of membranes (12) and (12a), respectively. Water vapor flows toward the top of evaporation chamber (2) and enters duct (31), and then flows into cylinders (11) and (11a), according to the following configuration:

If membrane (12) is deflating, water vapor is allowed to enter cylinder (11) by opening valve (29);

If membrane (12a) is deflating, water vapor is allowed to enter cylinder (11a) by opening valve (29a);

According to FIG. 4, water vapor enters cylinders (11) and (11a), and upon inflation of membranes (12) and (12a), the temperature of the water vapor increases, which transfers heat through the walls of cylinders (11) and (11a), and causing the water vapor to condense into liquid water. For liquid water to exit cylinders (11) and (11a) and flow through duct (6), the following applies:

If membrane (12) is inflating, liquid water is allowed to exit cylinder (11) by opening valve (26) at the end of membrane (12) inflation and before initiating deflation;

If membrane (12a) is inflating, liquid water is allowed to exit cylinder (11a) by opening valve (26a) at the end of membrane (12a) inflation and before initiating deflation;

According to FIG. 4, the liquid desiccant falls to the bottom of evaporation chamber (2) and flows through duct (4) to exit evaporation chamber (2). If the liquid desiccant is to flow in order to evaporate any remaining water it might contain, valve (35) is closed, valve (36) is opened, and pump (37) is activated, causing liquid desiccant to flow through duct (34) toward sprayers (32 and (32a), respectively.

According to FIG. 4, one membrane is always inflated while the other is deflated, since this method optimizes evaporation of water from the liquid desiccant with water, and additionally, the evaporation process is continuous. The inflation and deflation of membranes (12) and (12a) comprise a cycle consisting of two half-cycles: one half-cycle consists of the inflation of membrane (12) and deflation of membrane (12a), and the second half-cycle consists of the inflation of membrane (12a) and the deflation of membrane (12). Therefore, to inflate and deflate membranes (12) and (12a), the following applies:

during the first half-cycle to inflate membrane (12), valves (44) and (42) are opened, valves (43) and (45) are closed, and compressor (13) is active. In this state, compressor (13) suctions the fluid from membrane (12a) and, as a result, deflates membrane (12a).

during the second half-cycle to inflate membrane (12a), valves (43) and (45) are opened, valves (42) and (44) are closed, and compressor (13) is active. In this state, compressor (13) suctions the fluid from membrane (12) and, as a result, deflates membrane (12).

According to the above, valves (42), (43), (44) and (45) constitute a flow inverter device. In this embodiment of the invention, while one membrane compresses and condenses the vapor, the other membrane suctions the vapor to be compressed in the next half-cycle, thereby resulting in greater efficiency and continuous suction of vapor from evaporation chamber (2) through duct (31).

In one embodiment of the invention, the fluid used to inflate and deflate membrane (12) is a liquid. In this embodiment, compressor (13) is replaced by a pump.

Since the fluid used to inflate membranes (12) and/or (12a) (depending on which evaporation chamber (2) embodiment is implemented) does not come into contact with the water vapor, the lubrication units of compressor (13) or the pump do not require thermal insulation or specialized temperature control devices. Additionally, compressor (13) or the pump is placed outside evaporation chamber (2).

According to FIG. 2, in one embodiment of the invention, reservoir (5) has a closed tank (21) located therein. Duct (6) is connected to tank (21), and transfers the water extracted in evaporation chamber (2) thereto. Liquid desiccant with water flows into the space formed between tank (21) and reservoir (5), and thus, the extracted water transfers heat to the liquid desiccant with water before the liquid desiccant with water enters evaporation chamber (2). In this embodiment of the invention, reservoir (5) has a valve (22) by means of which water can be placed therein.

According to FIG. 1 and FIG. 2, duct (3), duct (4) and duct (6) constitute a counterflow heat exchanger (23). In heat exchanger (23), duct (6) through which the water flows from cylinder (11) toward reservoir (5), and duct (4) through which the liquid desiccant from evaporation chamber (2) flows toward capture means (1), transfer heat to duct (3) through which the liquid desiccant with water flows from capture means (1) toward evaporation chamber (2).

In one embodiment of the invention, duct (3) and duct (6) are operationally arranged so as to constitute a heat exchanger (23). In counterflow heat exchanger (23), duct (6) through which the liquid desiccant flows from cylinder (11) toward reservoir (5), transfers heat to duct (3) through which the liquid desiccant with water flows from capture means (1) toward evaporation chamber (2).

In one embodiment of the invention, the heat exchanger (23) is coated by a thermal insulation jacket.

According to FIG. 1, FIG. 2 and FIG. 3, compressor (13) is connected to control device (7), for the purpose of controlling when it is to be turned on and off. Valve (17), valve (18), valve (29) and valve (26) are also connected, in order to open or close them.

According to FIG. 4, compressor (13) is connected to control device (7), to control when it is turned on or off. Valves (26), (26a), (29), (29a) (33), (33a), (35), (36), (42), (43), (44) and (45) are also connected to control device (7).

In one embodiment of the invention, the internal pressure of the evaporation chamber (2) is lower than atmospheric pressure.

According to FIG. 1 and FIG. 2, the device has:
- temperature sensors (24) placed inside cylinder (11), reservoir (5), duct (3), duct (4) and duct (6); and
- two pressure sensors (27), one placed inside cylinder (11), and another placed in expansion chamber (28).

The temperature sensors (24) and the pressure sensors (27) are connected to the control device (7), for the purpose of collecting data for the control device.

In one embodiment of the invention, the components of the device are coated with thermal insulation material, except for compressor (13), control device (7), capture means (1) and the ducts that connect compressor (13) and membranes (12) and/or (12a) (depending on which evaporation chamber (2) embodiment is implemented).

The liquid desiccant of the present invention can be a solution of a compound selected from the group consisting of: glycols, $CaCl_2$ brine, $NaCl_2$ brine, or a combination thereof.

If a brine is used as the liquid desiccant:
- the salt concentration is between 25% and 35% in the solution of liquid desiccant with water that flows from capture means (1) toward evaporation chamber (2); and
- the salt concentration is between 35% and 70% in the solution of liquid desiccant that flows from evaporation chamber (2) toward capture means (1).

It must be understood that the present invention is not limited to the embodiments described and exemplified herein, and the person having ordinary skill in the art would understand that many other possible variations and modifications can be implemented which do not deviate from the spirit of the invention, which is only defined by the following claims.

The invention claimed is:

1. A device for extracting water from the environment, comprising:
   - a water collector to capture water from the environment using a liquid desiccant;
   - an evaporation chamber;
   - an evaporation mechanism comprising:
     - a cylinder located inside the evaporation chamber;
     - a membrane located inside the cylinder;
     - a compressor operationally connected to the membrane, to inflate and deflate the membrane;
   - a duct through which the liquid desiccant with water flows from the water collector to the evaporation chamber;
   - a duct through which the liquid desiccant flows from the evaporation chamber to the water collector;
   - a reservoir to store water extracted from the liquid desiccant in the evaporation chamber;
   - a duct through which the water flows from the evaporation chamber to the reservoir; and
   - a control device that controls the compressor.

2. The device from claim 1, characterized by the fact that the water collector is an inclined tray through which liquid desiccant flows in order to capture water.

3. The device from claim 1, wherein a connection between the compressor and the membrane comprises:
   - a duct connecting the membrane to a suction point of the compressor;
   - a valve located along the duct connecting the membrane to the suction point of the compressor;
   - a duct connecting a discharge point of the compressor to the membrane;
   - a tank located along the duct connecting the discharge point of the compressor to the membrane; and
   - a valve located along the duct connecting the discharge point of the compressor to the membrane, between the tank and the membrane.

4. The device from claim 1, wherein a connection between the compressor and the membrane comprises:
   - a duct connecting the membrane to a suction point of the compressor;
   - a tank located along the duct connecting the membrane to the suction point of the compressor;
   - a valve located along the duct connecting the membrane to the suction point of the compressor, between the membrane and the tank;
   - a duct connecting a discharge point of the compressor to the membrane; and
   - a valve located along the duct connecting the discharge point of the compressor to the membrane.

5. The device from claim 1, wherein the connection between the compressor and the membrane comprises:
   - a duct connecting the membrane to a suction point of the compressor;
   - a tank located along the duct connecting the membrane to the suction point of the compressor;
   - a valve located along the duct connecting the membrane to the suction point of the compressor, between the membrane and the tank;
   - a duct connecting a discharge point of the compressor to the membrane;
   - a tank located along the duct connecting the discharge point of the compressor to the membrane; and
   - a valve located along the duct connecting the discharge point of the compressor to the membrane, between the tank and the membrane.

6. The device from claim 1, wherein the evaporation mechanism comprises two membranes, a first membrane and a second membrane, and wherein the connection between the compressor and the two membranes comprises:
   - a duct connected to a discharge point of the compressor;
   - a duct connected to a suction point of the compressor;
   - a duct connected to a first membrane and connected to the duct connected to the discharge point of the compressor;
   - a duct connected to a second membrane and connected to the duct connected to the suction point of the compressor;
   - a duct connected to the duct connected to the discharge point of the compressor and to the duct connected to the second membrane;
   - a duct connected to the duct connected to the suction point of the compressor and to the duct connected to the first membrane;
   wherein the first valve and the second valve are operationally placed in the ducts, so that the second membrane deflates when the first membrane inflates and vice versa.

7. The device from claim 1, wherein the evaporation mechanism comprises two membranes, a first membrane and a second membrane, and wherein the connection between the compressor and the two membranes comprises:
   - a duct connected to a first membrane and to the discharge point of the compressor; and
   - a duct connected to a second membrane and to the discharge point of the compressor;

wherein the compressor can alternate the suction point and the discharge point, so that the second membrane deflates when the first membrane inflates and vice versa.

8. The device from claim 1, characterized by the fact that the reservoir contains a tank in which the water is placed, and the liquid desiccant with water is placed in the remaining volume between the tank and the reservoir.

9. The device from claim 1, characterized by the fact that the duct through which water flows from the cylinder to the reservoir comprises a valve located along the duct that opens during membrane inflation.

10. The device from claim 1, characterized by the fact that the duct through which liquid desiccant with water flows from the water collector to the evaporation chamber and the duct through which water flows from the cylinder to the reservoir are operationally arranged so as to constitute a heat exchanger.

11. The device from claim 1, characterized by the fact that the duct through which liquid desiccant with water flows from the water collector to the evaporation chamber, the duct through which water flows from the cylinder to the reservoir, and the duct through which liquid desiccant flows from the evaporation chamber to the capture means are operationally arranged so as to constitute a heat exchanger.

12. The device from claim 1, characterized by the fact that the liquid desiccant is selected from the group consisting of glycols, $CaCl_2$ brine, $NaCl_2$ brine, and a combination thereof.

13. The device from claim 12, characterized by the fact that the brine consists of:
   a salt concentration between 25% and 35% in the solution of liquid desiccant with water; and
   a salt concentration between 35% and 70% in the solution of liquid desiccant.

14. The device from claim 1, characterized by the fact that the evaporation chamber comprises two sprayers connected to the duct through which liquid desiccant with water flows from the water collector to the evaporation chamber.

15. The device from claim 14, characterized by the fact that two cylinders of the evaporation mechanism, one per sprayer, are placed inside the evaporation chamber.

16. The device from claim 1, characterized by the fact that the evaporation chamber is double-jacketed, wherein the liquid desiccant flows between a first jacket and a second jacket.

17. The device from claim 16, characterized by the fact that the liquid desiccant with water flows between the second jacket of the evaporation chamber and a wall of the cylinder.

18. The device from claim 16, characterized by the fact that the second jacket is lower in height than the evaporation chamber and is made of a thermal insulation material.

19. The device from claim 16, characterized by the fact that the evaporation chamber has a top and said top has an expansion chamber, in which water vapor is expanded.

20. The device from claim 1, comprising a sprayer connected to the duct through which the liquid desiccant with water flows from the water collector to the evaporation chamber, located inside the evaporation chamber.

21. The device from claim 20, comprising a duct through which liquid desiccant with water flows from the evaporation chamber toward the cylinder of the evaporation mechanism and through to an expansion chamber in the evaporation mechanism.

22. The device from claim 21, characterized by the fact that the duct through which water vapor flows from the evaporation chamber toward the cylinder of the evaporation mechanism comprises a first valve, and a second valve connecting the cylinder to the expansion chamber.

23. The device from claim 22, characterized by the fact that:
   the first valve and the second valve open when the membrane is deflating, allowing water vapor to flow into the cylinder; and
   the first valve and the second valve are closed when the membrane is inflating.

\* \* \* \* \*